(12) United States Patent
Nishijima et al.

(10) Patent No.: US 6,998,167 B2
(45) Date of Patent: Feb. 14, 2006

(54) THIN SECONDARY BATTERY

(75) Inventors: Motoaki Nishijima, Kitakatsuragi-gun (JP); Kazuo Yamada, Kitakatsuragi-gun (JP); Takehito Mitate, Yamatotakada (JP); Hiroshi Matsumura, Kitakatsuragi-gun (JP); Hideo Suzue, Nara (JP); Shigemi Asai, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 252 days.

(21) Appl. No.: 10/432,159

(22) PCT Filed: Nov. 20, 2001

(86) PCT No.: PCT/JP01/10147

§ 371 (c)(1), (2), (4) Date: Sep. 11, 2003

(87) PCT Pub. No.: WO02/43167

PCT Pub. Date: May 30, 2002

(65) Prior Publication Data

US 2004/0043288 A1 Mar. 4, 2004

(30) Foreign Application Priority Data

Nov. 21, 2000 (JP) .................................... 2000-354221

(51) Int. Cl.
*H01M 2/02* (2006.01)

(52) U.S. Cl. ...................... 428/163; 429/176
(58) Field of Classification Search ............... 429/148, 429/162, 163, 175, 185
See application file for complete search history.

(56) References Cited

FOREIGN PATENT DOCUMENTS

| JP | 63-32454 | 3/1988 |
|----|----------|--------|
| JP | 8-17179 | 1/1996 |
| JP | 10-13512 | 1/1998 |
| JP | 11-195404 | 7/1999 |
| JP | 2000-77043 | 3/2000 |
| JP | 2000-348693 | * 12/2000 |

OTHER PUBLICATIONS

Microfilm of the specification and drawings annexed to the request of Japanese Utility Model Application No. 125632/1986 (Laid–open No. 32454/1988), (Sanyo Electric Co., Ltd.), Mar. 02, 1998, Claims of Utility Model.

* cited by examiner

Primary Examiner—Michael Barr
Assistant Examiner—Monique Wills
(74) Attorney, Agent, or Firm—Nixon & Vanderhye, P.C.

(57) ABSTRACT

A thinner secondary battery can be provided by a thin secondary battery characterized by comprising a battery element obtained by stacking positive electrode layers, electrolyte layers and negative electrode layers and laminates sealing front and back surfaces of the battery element, wherein the laminates each are made of a stacked body constructed of at least an adhesive layer and a metal layer in the order from the battery element side and the metal layer in the front surface side of the battery element and the metal layer in the back surface side thereof are different from each other in strength or thickness, or both of them.

7 Claims, 1 Drawing Sheet

THIN SECONDARY BATTERY

This application is the US national phase of international application PCT/JP01/10147 filed 20 Nov. 2001, which designated the US.

1. Technical Field

The present invention relates to a thin secondary battery. More particularly, the present invention relates to a thin secondary battery enabling a long time use of thin portable equipment.

2. Prior Art

In the trend of a rapid spread of a portable telephone and mobile equipment (portable equipment) such as a portable terminal for use of the internet, more of down-sizing, reduction thickness and weight reduction of portable equipment have been strongly demanded. As one of power sources of such portable equipment, there is named a lithium ion battery. Since this type of battery has features such as a high energy density, and light weight, batteries of the type have been installed in a number of portable equipment and a production volume has been on the steady increase. A prior art lithium ion battery is of a construction in which a battery element is contained and sealed in a sealed outer can made of steel or aluminum. A lithium ion battery has experienced a progressed technical development in order to meet the demand for reduction thickness of equipment, having resulted in production of batteries of 4 mm or less in total thickness.

Further competition toward reduction thickness of portable equipment has been very energetically conducted in which a new target has been set to a level of 0.1 mm. Since a short usage time is a fatal fault to portable equipment, a small size battery cannot be adopted simply because of being small in size. Moreover, in a can type of battery, under limitation imposed on fabrication of an outer can, a battery of this type has the lower limit of the order of 4 mm in thickness and even if a thinner type of a battery element was able to be fabricated, a thickness of the outer can itself would be excessively thicker relative to a thickness of the battery element as a whole, which makes it harder to achieve a high energy density. In such a current situation, a reality is that a battery restricts the minimum thickness of equipment in more of cases where batteries are used as power sources and there has been built up a strong desire for development of a battery simultaneously satisfying requirements for a low thickness and high capacity density.

Therefore, in order to solve the above problem, a battery has been developed that uses a polymer as an electrolytic solution and a laminate unnecessary for a hard outer can as an outer covering.

The laminate generally has a layer structure constructed of an adhesive layer for sealing a battery element, a metal foil for preventing water from invading it and when required, a protective layer for a purpose to improve a needle sticking strength of a surface or the like. The laminate has a total thickness of the order in the range of from 100 to 200 $\mu$m and is sufficiently thinner than a battery of a can type. Furthermore, since a battery can be sealed in a laminate in the shape of a bag, no limitation is placed on a battery thickness, thereby enabling a thin battery to be obtained. Therefore, a battery used the laminate has been very much expected as a battery for portable equipment.

Since a battery of this type has a weakness against an inner pressure, when the inner pressure in the battery increases, the battery is swollen with a remaining possibility to eject the contents in an unspecified direction. In a case where a battery of this kind is installed in portable equipment, the battery is required for withstanding an external force in order to be demountable singly as a battery pack. Therefore, a hard outer covering is required separately in addition to the laminate outer covering for a battery. Besides, in a case of a built-in type as well, an adhesive layer is necessary for adhering the battery to a case. Accordingly, a battery used the laminate type had a chance that it cannot practically contribute to reduction thickness of equipment.

In order to incorporate a thin battery into equipment efficiently, various kinds of methods have been proposed. For example, in Japanese Unexamined Patent Publication No. HEI 8(1996)-17179, proposal has been made on a technique to embed a film battery in a substrate in order to facilitate mounting of the battery into equipment. Moreover, in Japanese Unexamined Patent Publication No. HEI 10(1998)-13512, proposal has been made on a technique to embed a thin battery in the interior of a case, from which the thin battery is demountable.

Since the techniques, however, actually incorporate a film battery having even an outer covering made of a laminate, they cannot be said to have offered a sufficient contribution to reduction thickness of equipment. While there has been disclosed a technique for a battery to be integrated with a circuit board into a single piece, simple integration with a resin layer of which the circuit board is made disables perfect prevention of invasion of water into the battery; therefore, the technique has led to a case where a long time usage becomes problematic.

DISCLOSURE OF THE INVENTION

According to the present invention, there is provided a thin secondary battery comprising a battery element obtained by stacking a positive electrode layer, an electrolyte layer and a negative electrode layer; and laminates sealing a front surface and back surface of the battery element, wherein each of the laminates is made of a stacked body constructed of at least an adhesive layer and a metal layer in this order from the battery element side, and the metal layer at the front surface side of the battery element and the metal layer at the back surface side thereof are different from each other in either strength or thickness, or both.

MODE FOR CARRYING OUT THE INVENTION

Figure 1:
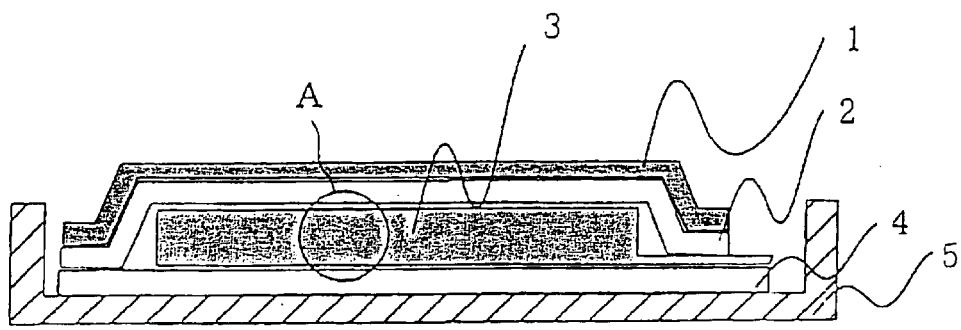
FIG. 1 is a sectioned side view of an example embodiment of a battery.

According to the present invention, by changing either a strength of each metal layer or a thickness thereof or both, a battery is swollen at the side weak in strength of the battery or the thinner side thereof when an anomaly in the battery outbreaks; thereby, enabling a direction of ejecting the contents to be specified.

In addition, a thicker metal layer is of an inwardly concave shape and a battery element is housed in an inner side of the inwardly concave shape, thereby enabling a direction of the thicker metal layer of ejecting the contents to be more specified.

Furthermore, by using a metal, as a material of the thicker metal layer, selected from the group consisting of an aluminum alloy and a magnesium alloy, a thinner, lighter battery can be obtained.

Moreover, while, in order to molding the materials, there are available a casting method in which a metal is cast into a casting mold and a method in which a rolled sheet is molded by press, both methods can be applied. More preferably, a metal layer obtained by press the sheet can be thinner and no necessity arises for a worry that a pin hole or the like might occur in a case where a thinner sheet is produced by press, thereby enabling increase in reliability of a battery.

Since, by using the thicker metal layer additionally as a case in this way and disposing a thinner metal layer so as to be located facing the inner side of a portable equipment, no liquid is ejected directly to the user side even if liquid leakage occurs in a battery, enabling a safety to be ensured when an anomaly occurs. Besides, since the thicker metal layer combines with a case, one laminate that has been traditionally necessary is no longer required, which can contribute to reduction thickness of equipment. Alternatively, in a case where a total thickness including those of a case and a battery is assumed the same as a prior art practice, a battery capacity can be considerably raised.

Further detailed description will be given of the present invention below.

A thickness of a thicker metal layer is preferably on the order in the range of from 0.4 mm to 1.5 mm since strength is required in the case where the thicker metal layer combines with the case. If the thickness is thinner than the lower limit, a strength as the case cannot be sustained at a sufficient level, while if the thickness is thicker than the upper limit, such the battery is hard to satisfy requirements for reduction thickness of equipment and a lighter weight thereof. Note that as cases in the present invention, there are exemplified cases of various kinds of portable equipment such as a notebook personal computer, a video camera, camera, a portable telephone and others.

In a case where the thicker metal layer is not required to play an additional role as the case, a thickness of the thicker metal layer is preferably of the order in the range of from 0.05 to 200 mm.

Note that, even if the thicker metal layer plays or does not play additional role as the case, there are exemplified as metal layers made of an aluminum alloy obtained by adding magnesium into aluminum, a magnesium alloy obtained by adding aluminum and zinc into magnesium and the like.

A thickness of the thinner metal layer is not specifically limited as far as it can prevent invasion of water into the battery, but the thickness is usually specified preferably in the range of from of 10 to 300 $\mu$m. Furthermore, a total thickness including the battery is preferably in the range of from 30 to 200 $\mu$m from the viewpoint of a needle sticking strength against a protrusion or the like. In a case where a protective layer is further provided in the thinner metal layer side, no necessity arises for a great strength of the metal layer but it is only required to design the metal layer placing emphasis on preventing invasion of water. For example, since there is also recently available a pinhole free aluminum foil even of the order of 15 $\mu$m because of improvement of a rolling technique, such an aluminum foil of in the range of from 15 to 25 $\mu$m may also be used. Note that it is more important to be pinhole free than a thickness with the respect to prevention of water invasion. In a case where the metal layer in the laminate at one surface is thinner in such a way, a feature is ensured that sealing is realized with a good reliability by means such as to heat the laminates from the thinner metal layer side even with a large heat capacity of the metal layer in the opposed side.

The thinner metal layer is preferably made of a foil of a metal such as aluminum, stainless, nickel, copper or the like.

While, in the above case, an ejecting direction of the contents is specified by changing a thickness of metal layers, the ejecting direction of the contents can also be specified by using materials different in strength even with the thicknesses of the same order. A strength of the present invention is defined by comparing a tensile strength or the like of a metal of which the metal layer is made. It is preferable that a difference in tensile strength is basically such that a ratio of a higher strength to a lower strength (a higher strength/a lower strength) of metals is larger than 1. The ratio is more preferably more than 2 or larger and especially preferably 5 or larger. By using metals satisfying a ratio in the range, an ejection direction of the contents can be specified with more of certainty when an anomaly occurs.

An adhesive layer is laminated on the metal layer; thereby completing the laminate.

As the adhesive layer, there is exemplified a thermo-weldable resin film. To be concrete, there is further exemplified film made of resins such as polyethylene, polypropylene, modified polyethylene, modified polypropylene, ionomer resin, thermo-weldable polyimide or methyl polymethacrylate. A thickness of the adhesive layer is preferably on the order in the range of from 20 to 250 $\mu$m. The thickness is more preferably in the range of 80 to 200 $\mu$m from the viewpoints of thermal weldability, a film strength and film physical properties, though it is different according to a material. If the adhesive layer is excessively thin, invasion of water cannot be sufficiently prevented, while if it is excessively thick, heat is insufficiently transferred to a resin film in thermowelding, which reduces airtightness reliability or decreases an energy density of the battery, which is not preferable.

The battery element usually has a metal tab for external connection and in order to improve sealability at a lead-out portion of the metal tab, it is also possible to provide another adhesive layer made of the thermo-weldable resin at the lead-out portion.

A protective film can also be provided on the side (the battery surface side) of the metal layer opposite to the adhesive layer (an inner side of a battery) in order to improve a needle sticking strength. As the protective film used herein, there is exemplified film made of nylon, polyester, PET or the like. Note that in a case where the thinner metal layer side is located in the inner side of the equipment, there is no chance for a force to act thereon especially from outside, therefore such the protective film can be omitted in the thinner side.

The battery element obtained by stacking a positive electrode layer, an electrolyte layer and a negative electrode layer is sealed with laminates described above different in thickness from each other to complete the battery. As shapes of laminates for sealing the battery, there can be exemplified the case where one of the laminates or both thereof have recesses of depths totally as deep as a thickness of the battery. In the former case, the recess is formed in the thin side (the smaller strength side) with more of simplicity. In a case where one laminate combines with the case, the recess can also be simultaneously made when the case itself is formed by press. Note that in a case where the battery element is very thin, either of the laminates can be adapted in the shape of a flat sheet.

As means sealing with the adhesive layer, a method is generally adopted in which a heater or the like is used to heat and adhere. In addition, adhesive layers can be thermally welded to each other by irradiating the layers with an ultrasonic wave. In a case where the laminate plays an additional role as the case, if a thickness of the case is excessively large, a heat capacity is large; therefore, a case arises where no sufficient reliability is obtained with the former method, in which case the latter method is effective.

A total thickness of the battery including the battery element is preferably 3 mm or less and more preferably 2 mm or less. Herein, in an ordinary battery, a total thickness of laminates is on the order of 300 μm, which corresponds to about 10% in a case where a total thickness of the battery is 3 mm. In contrast to this, in the present invention, since one side of a pair of laminates, which are necessary in an ordinary battery, can be omitted, omission of the one side can provide a space for the battery element. Especially, in a case where a total thickness of the battery is 2 mm or less, a capacity thereof can be improved by at least 10% or more. Furthermore, in a case where the battery sealed with the laminates is in the form of a battery pack, a necessity arises for use of a strong outer covering, but the battery of the present invention can also omit the constituent.

The battery element is made of a stacked body constructed of the positive electrode layer, the solid electrolyte layer and the negative electrode layer, and the stacked body as a basic unit can be further stacked according to a design capacity.

Herein, the positive electrode layer can be fabricated in a general procedure in which a positive electrode active material, a conductive material and a binder dissolved or dispersed in a solvent are mixed into each other to form a slurry and the slurry is coated or filled on one side or both sides of a current collector. In fabrication of the positive electrode layer, it is preferable that in order to increase a bindablity, a heat treatment is applied to the current collector with the slurry thereon at a temperature in the neighborhood of a melting point of the binder and higher than a boiling point of the solvent.

As the current collector, there is used collector made of a metal element itself, an alloy or the like, To be more detailed, there is exemplified the collector made of titanium, aluminum, stainless steel or the like. Furthermore, there can be used the collector made of copper, aluminum or stainless steel on each of which a film made of titanium or silver is formed.

A Shape thereof is exemplified, which is in addition to a foil, a film, a sheet, a net, a punched piece, a lath body, a porous body, a foamed body, a molded body of fibers and others. A thickness of the current collector is not specifically limited, but is preferably in the range of 1 μm to 1 mm and more preferably in the range 1 to 100 μm from the viewpoints of a strength, a conductivity and an energy density when the battery is fabricated.

As the positive electrode active material, there is exemplified lithium-containing oxides such as $Li_xM1_yM2_{1-y}O_2$ (, wherein M1 indicates one of Fe, Co and Ni, M2 indicates a metal selected from the group consisting of transition metals, metals of the group 4B and the group 5B, x=0 to 1 and y=0 to 1) represented by $LiCoO_2$ and $LiNiO_2$, $LiMn_{2-x}M2_xO_4$ (, wherein M2 indicates a metal selected from the group consisting of transition metals, metals of the group 4B and the group 5B and x=0 to 2) represented by $LiMn_2O_4$, or the like. Furthermore, there may be used a oxide containing no lithium such as $MnO_2$, $MoO_3$, $V_2O_5$, $V_6O_{13}$ or the like. Among them, a lithium containing transition metal chalcogenide is preferable in consideration of safety in a fabrication process since the battery can be completed in a discharge state. Note that an oxide containing no lithium requires incorporation of lithium into the negative electrode layer or the positive electrode layer in advance.

Furthermore, the conductive material and the binder are mixed into the positive electrode active material described above in order to impart a conductivity and a bindability to thereby form the positive electrode layer. A mixing rate in this case can be in the range of 1 to 50 parts by weight of the conductive material and 1 to 30 parts by weight of the binder relative to 100 parts by weight of the active material. A mixing ratio of the conductive material is more preferably in the range of from 2 to 20 parts by weight and further more preferably in the range of from 2 to 10 parts by weight. In a case where viscosities of the electrolyte and a precursor of a gel electrolyte are high, it is effective to use a smaller fraction of the conductive material to secure a percentage of void in order to improve seeping-in of an electrolytic solution. In a case where less of the conductive material is used, it is possible to improve the active material density in the electrode, in which case the active material density is preferably 2.8 g/cc or more and more preferably in the range of 3.0 to 3.4 g/cc.

As the conductive material, there can be used carbon such as carbon black (including acetylene black, thermal black, channel black and the like), graphite powder, metal powder and others, but no specific limitation is imposed thereon. As the binder, there can be used fluorine-containing polymer such as polytetrafluoroethylene or polyfluorovinylidene, polyolefin polymer such as polyethylene or polypropylene, synthetic rubber and others, but no specific limitation is imposed thereon.

If the conductive material is less than 1 part by wt or the binder is more than 30 parts by weight, an internal resistance, a polarization or the like of the battery is enhanced, which reduces a discharge capacity of the electrode; therefore, fabrication of a practical lithium secondary battery become harder. If a conductive material is more than 50 parts by weight, a mass of active material contained in the electrode is relatively reduced; therefore, a discharge capacity as the positive electrode is lowered. Unless the binder is equal to or more than 1 part by wt, a bindability of the active material is lost to thereby cause falling-off of the active material and reduce a mechanical strength thereof, which leads to difficulty in fabrication of the battery, while if the binder is more than 30 part by wt, similar to the case of the conductive material, a mass of the active material contained in the electrode is relatively reduced to furthermore, cause an internal resistance, polarization or the like of the electrode to be enhanced and to reduce a discharge capacity, which is not practical.

As an negative electrode material used in the negative electrode layer, there can be used lithium metal, a lithium metal alloy (for example, an alloy of lithium and aluminum), a carbon material and a metal oxide that can absorb and disrobe lithium and others. The carbon material is promising because of safety and cycle characteristics. As the carbon material, there can be used well known material that have been traditionally used which is exemplified graphite material (natural or artificial and the like), petroleum coke, cresol resin burned carbon, furan resin burned carbon, polyacrylonitril burned carbon, vapor phase growth carbon, mesophase pitch burned carbon, a graphite material obtained by forming an amorphous carbon layer on a surface of carbon with high crystallinity and others. Among the carbon material, the graphite material with a high crystallinity can preferably flatten a voltage of a battery and raise an energy density. Furthermore, among the carbon materials, the graphite material having the amorphous carbon layer on a surface of each of graphite particles conducts less of a side reaction with an electrolytic solution, therefore, the graphite material is especially preferably used in a case of the battery weak against an internal pressure like the battery sealed with laminates.

In a case where the carbon material described above is used in the negative electrode layer for a lithium ion secondary battery, the negative electrode layer can be formed using a mixture of the carbon material (preferably, a material made of particles) and a binder. On this occasion, in order to increase a conductivity, a conductive material can also be mixed into the mixture. As the binder used herein, there can be used fluorine-containing polymer such as polyfluorovinylidene or polytetrafluoroethylene, polyolefin polymer such as polyethylene and polypropylene, synthetic rubber or the like, but no specific limitation is imposed thereon.

A mixing ratio of the carbon material and the binder can be in the range of from 99 to 1 to 70 to 30 in weight ratio. If a weight ratio of the binder is more than 70 to 30, an internal resistance or polarization of the battery is enhanced to cause a discharge capacity to be reduced, which makes it harder to fabricate a practical lithium secondary battery. On the other hand, if a weight ratio of the binder is less than 99 to 1, a bindability of the carbon material itself or a bindability between the carbon material and a current collector becomes insufficient to cause falling-off of the active material and reduce a mechanical strength thereof, which leads to difficulty in fabrication of the battery.

The negative electrode layer is fabricated in a general procedure in which the active material, the binder dissolved or dispersed in a solvent and, when required, the conductive material, described above, are mixed to form a slurry and the slurry is coated on or filled in the current collector. On this occasion, in order to increase a bindability and to remove the solvent for the binder, the negative electrode layer is preferably subjected to a heat treatment at a temperature of the boiling point or higher of the solvent and in the neighborhood of the melting point of the binder under vacuum, in an inert gas atmosphere, or in the air.

As the current collector, there is available collector made of copper, nickel or the like. Shapes are used, which are; in addition to a foil, such as a film, a sheet, a net and a punched piece, a lath body, a porous body, a foamed body and a molded body of fibers. A thickness of the current collector is not specifically limited but preferably in the range of from 1 $\mu$m to 1 mm and more preferably in the range of from 1 to 100 $\mu$m from the view points of a strength, a conductivity, an energy density when a battery is fabricated. No specific limitation is imposed on the conductive material, but there can be used carbon (carbon black (including acetylene black, thermal black, channel black and the like) and metal powder and others).

The electrolyte is not specifically limited, but there can be used, for example, an organic electrolytic solution (composed of an electrolyte salt and an organic solvent), a polymer solid electrolyte, an inorganic solid electrolyte, a fused salt or the like and among them, the polymer solid electrolyte can be preferably used. As the polymer solid electrolyte, there can be used a material constituted of an electrolyte and a polymer dissociating the electrolyte, a polymer with a ionizable group or the like. As the polymer dissociating the electrolyte, there is available, for example, a polyethylene oxide derivative or a polymer including the derivative, a polypropylene oxide derivative or a polymer including the derivative, a phosphate ester polymer and others. Furthermore, included in this polymer solid electrolyte is a gel electrolyte described below in addition to the electrolytes described above.

The gel electrolyte means a solid electrolyte in the state of a gel obtained by adding an electrolyte salt and an organic solvent into a polymer. The gel electrolyte has a feature of a solid electrolyte having no worry about liquid leakage and an ionic conductivity close to that of a liquid, therefore, is very promising.

An organic compound each for forming a skeleton of the gel electrolyte is any of compound, having an affinity with a solvent solution of an electrolyte, and having a polymerizable functional group, on which any other specific limitation is imposed. There is exemplified a compound having a polyether structure and an unsaturated double bond group; an oligoester acrylate, a polyester, a polyimine, a polythioether, a polysulfane or the like, which are used singly or in combination of two or more kinds. Note that it is preferable to use a compound having a polyether structure and an unsaturated double bond because of an affinity with a solvent.

As the polyether structural unit, there is exemplified ethylene oxide, propylene oxide, butylene oxide, glucidyl ether and others and they can be preferably used singly or in combination of two or more kinds. Furthermore, in a case where two or more kinds are combined, a way of polymerization can be properly selected any of a block type or a random type. As unsaturated double bond group, there is exemplified an allyl group, a methallyl group, a vinyl group, an acroyle group, a methaloyl group or the like.

As the organic solvent used in the gel electrolyte, there is exemplified and used cyclic carbonate such as propylene carbonate (PC), ethylene carbonate (EC) or butylene carbonate, chain carbonate such as dimethyl carbonate, diethyl carbonate, ethylmethyl carbonate, or dipropyl carbonate, lactone such as γ-butylo lactone or γ-valero lactone, furan such as tetrahydrofuran or 2-methyltetrahydrofuran, ether such as diethyl ether, 1,2-dimethoxyethane, 1,2-diethoxyethane, ethoxymethoxy ethane or dioxane, dimethylsufoxide, sulforane, methylsulforane, acetonitril, methyl formate or methyl acetate.

As the electrolyte salt, there is exemplified lithium salt such as lithium perchlorate ($LiClO_4$), lithium borofluoride, ($LiBF_4$), lithium fluorophosphate ($LiPF_6$), lithium hexafluoroarsenate ($LiAsF_6$), lithium hexafluoroantimonate ($LiSbF_6$), trifluoromethane sulfonate ($CF_3SO_3Li$), lithium trifluoroacetate ($CF_3COOLi$) or the like, and lithium trifluoromethane sulfonic acid imide ($LiN(CF_3SO_2)_2$) and they can be used singly or in combination of two or more kinds.

The gel electrolyte is obtained in a procedure in which the electrolytic solution is prepared by dissolving the electrolyte salt into the solvent selected from the group described above, which is mixed into an organic compound described above to thereby perform polymerization.

As the polymerization method, there can be named a thermal polymerization, photopolymerization or radiation polymerization. A thermal polymerization initiator and a photopolymerization initiator can be initiators well known to those having a skill in the art. Furthermore, an amount of a polymerization initiator can be properly selected according to a composition or the like.

EXAMPLES

Description will be given of details of the present invention using examples, but the present invention is not limited to them. Note that while a thickness in the figures is partly expressed exaggeratively for description, a relationship of a thickness with others in the figures actually is not bound by those depicted in the figures.

Example 1

Preparation of Positive Electrode Layer

Lithium cobaltate ($LiCoO_2$) was used as a positive electrode active material. Polyfluorovinylidene, which is a binder, was once dissolved into N-methy-2-pyrrolidone, which a solvent, in a mortar to obtain a binder solution. The positive electrode material and acetylene black were mixed into each other and the mixture was dispersed into the solution to prepare a paste.

The paste thus prepared was coated on both surfaces of a current collector made of an aluminum foil, the coats were preliminarily dried at 60° C. and applied a heat treatment on the coats at 150° C., followed by press. The current collector was punched therethrough to obtain a coated portion of 65×65 mm in size of a positive electrode layer with a non-coated portion in the shape of a tab. Then, the coated portion of the positive electrode layer with the non-coated portion of the tab were dried under a reduced pressure at 180° C. for removal of water to use the dried coated portion as the positive electrode layer. A coating density was 3.0 $g/cm^3$ and a total thickness of the positive electrode layer was 140 μm. Furthermore, an positive electrode layer with one coated surface in the same shape and size as the positive electrode layer with double coated surfaces was prepared in a similar way to that adopted as described above.

Preparation of Negative Electrode Layer

Artificial graphite MCMB (with a particle diameter of 12 μm, d (002)=0.337 nm and a R value=0.4) was dispersed into a solution obtained by dissolving a polyfluorovinylidene, which is a binder, into N-methyl-2-pyrrolidone, which is a solvent, in a mortar to thereby obtain a paste, to coat the paste on both surfaces of a copper foil, to preliminarily dry the coats at 60° C. and to apply a heat treatment on the coats at 150° C., followed by press. The copper foil after the press was punched therethrough to obtain a coated portion of 64×64 mm in size of a negative electrode layer with a non-coated portion in the shape of a tab. Then, the coated portion of the positive electrode with the non-coated portion of the tab was dried under a vacuum at 200° C. for removal of water to use the dried coated portion as the negative electrode layer. A coating density was 1.5 $g/cm^3$ and a thickness of the negative electrode layer was 130 μm.

Preparation of Battery Element 10 g of a copolymer of polyethylene oxide-polypropylene oxide with diacrylate having a molecular weight of 2000 was dissolved into 50 g of a solvent composed of ethylene carbonate (hereinafter referred to as EC) and diethyl carbonate (hereinafter referred to as DEC) mixed at a ratio of 1 to 1 in volume in which 1 M of $LiPF_6$ was dissolved, and 0.06 g of a polymerization initiator was added to the solution.

The solution was impregnated into non-woven fabric of 16 μm in thickness made from polypropylene, the impregnated fabric was sandwiched between glass plates and the impregnated fabric was irradiated with ultraviolet so that the solution in the fabric is gelated to obtain a gel electrolyte layer.

The positive electrode layer and the negative electrode layer were impregnated with the solution, the impregnated layers were sandwiched between glass plates and irradiated with ultraviolet so that the solution in the electrode layers was gelated to thereby obtain a gel electrolyte composite electrode. Two negative electrode layers, three positive electrode layers (the outermost layers each were a positive electrode layer with one coated surface) and 4 electrolyte layers are stacked to prepare a battery element.

Preparation of Laminate and Battery

A laminate with a thicker metal layer was prepared in a manner such that a modified polypropylene film of 50 μm in thickness as an adhesive layer was adhered onto an aluminum alloy sheet of 0.8 mm in thickness to cut the sheet into a size of 70×70 mm. A laminate with a thinner metal layer was prepared in a manner such that a modified polypropylene film of 40 μm in thickness as an adhesive layer and a PET film of 30 μm in thickness as a surface protective layer were adhered onto an aluminum foil of 80 μm in thickness. The battery element was sandwiched between the laminates, the laminates were thermowelded to each other along the peripheral portions thereof under reduced pressure to seal and prepare a thin battery.

The obtained battery was subjected to CC-CV charge in conditions of a charge termination voltage of 4.1 V and a charge current value of 60 mA. A charge was terminated when a charge current value was reduced down to a value of 5% of a set current. Discharge was conducted at a low current of 60 mA and terminated at a discharge termination voltage of 2.75 V. As a result of measurement, a capacity at the set current value was 330 mAh. Five batteries with the same specifications as the described above were prepared and a charge current of 5 A was continued to be fed to each of the batteries in an overcharge test. During the test, all of the batteries each were swollen in a direction of a surface of a laminate with a thinner metal layer and as the current was further continued to flow at the same value, the contents were eventually ejected in the direction of a surface of a laminate with a thinner metal layer.

Comparative Example 1

A battery was prepared in a similar way to that adopted Example 1 with the exception that a laminate with a thicker metal layer in Example 1 was changed to a laminate with a thinner metal layer. A capacity of the obtained battery was 330 mAh. Five batteries with the same specifications as described above were prepared and a charge current of 5 A was continued to be fed to each of the batteries in the overcharge test. During the test, all of the batteries each were swollen uniformly at both of front and back sides and as the current was further continued to flow at the same value, the contents were eventually ejected in the direction of either the front surface side or the back surface side with the result that a ratio between ejection of contents at the front surface side and the back surface side was 3 to 2.

Example 2

Figure 2:
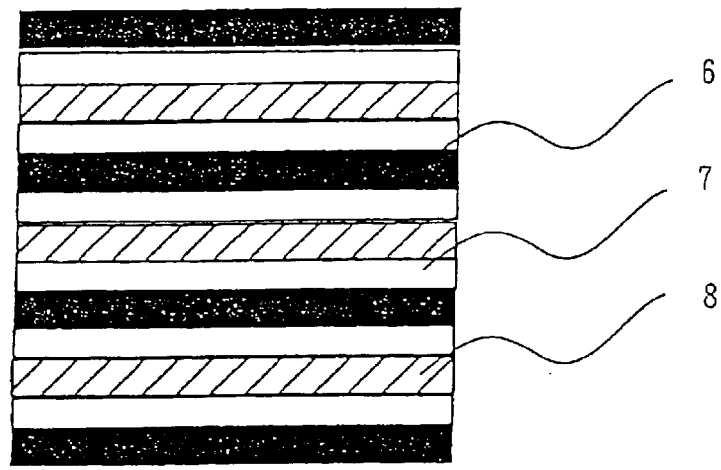
FIG. 2 is a sectioned side view of an example embodiment of a battery element suitable for use in a battery.

According to description in Example 1, positive electrode layers 6, negative electrode layers 8 and electrolyte layers 7 were prepared and a battery element was fabricated by stacking 3 negative electrode layers and 4 positive electrode layers (see FIG. 2). A battery was fabricated in a similar way to that adopted in Example 1 with the exception that a case obtained by press aluminum alloy sheet of 0.8 mm in thickness was used instead of a thicker metal layer (see FIG.

1). The fabricated battery is integrated with the case in a single piece. A total thickness of the case and the battery in a stacked state was 2 mm and a discharge capacity was 480 mAh. In FIG. 1, a numerical reference 1 indicates a thinner metal layer, 2 and 4 adhesive layers, 3 a battery element and 5 a case. FIG. 2 corresponds to the portion A of the battery element 3 of FIG. 1.

Comparative Example 2

Figure 3:
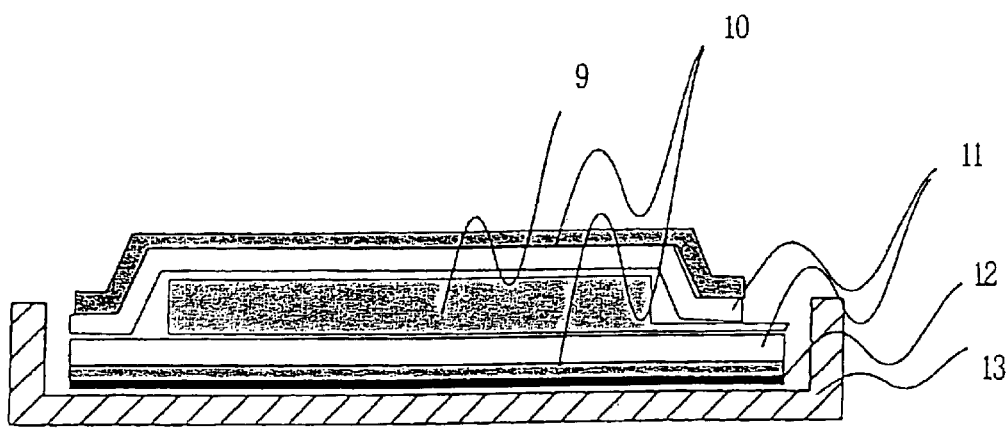
FIG. 3 is a sectioned side view of another example embodiment of a battery.

A battery fabricated in a similar way to that adopted in Comparative Example 1 was adhered to a case in the same shape as the aluminum alloy used in Example 2 using a pressure sensitive adhesive double coated tape (adhesive layer)(see FIG. 3). A thickness of the tape was about 90 μm and a total thickness of the battery was 1.9 mm and almost the same as in Example 2. A capacity of the obtained battery was 330 mAh. In FIG. 3, a numerical reference 9 indicates a battery element, 10 a metal layer, 11 and 12 adhesive layers and 13 a case.

As understood from the examples and the comparative examples, in a thin battery, a fraction in thickness of laminates is large even with the use of the laminates capable of being reduced in thickness compared with a battery can. Moreover, in a case where the battery is adhered to a case of equipment, an adhesive layer, which is a pressure sensitive adhesive double coated tape, is further required and a corresponding thickness is required to be considered in design, therefore, a thickness corresponding to one unit of battery element is wasted. The waste in thickness is very large, which results in a difference between battery capacities of an example and a comparative example by about a factor of 1.5. Therefore, consideration being given to a case where a mounting thickness of a thin battery in equipment is the same, large reduction occurs in capacity of the thin battery with a limited number of stacked layers.

Furthermore, while in the examples and the comparative examples described above, comparison was conducted between batteries with a MD size, a considerably large difference will be revealed in capacity of batteries with a B5 or an A4 size, which are sizes of personal computers, as a result of the comparison.

Note that while batteries were designed this time so that a total thickness of all of each battery is the same as that of the others, needless to say that a total thickness of all of a battery can be naturally thinner if a capacity is designed to be the same.

In the trend where a severe demand has been built up for a thinner gadget, it is possible that an energy density is greatly improved and in turn, a usage time of a thin portable equipment can be greatly extended by using a thickness of a laminate as that of a battery element as a power source. Furthermore, in a case where the same battery capacity is sufficient, a total thickness of equipment including a battery can be reduced. Moreover, when an anomaly occurs, a safety to a user can be secured since an ejecting direction of contents is specified.

What is claimed is:

1. A thin secondary battery comprising
a battery element obtained by stacking a positive electrode layer, an electrolyte layer and a negative electrode layer; and
laminates sealing a front surface and back surface of the battery element,
wherein each of the laminates is made of a stacked body constructed of at least an adhesive layer and a metal layer in this order from the battery element side, the metal layer at the front surface side of the battery element and the metal layer at the back surface side thereof are different from each other material, and the metal layer at the front surface side combines with a case of an electronic equipment.

2. A thin secondary battery of claim 1, wherein the metal layer at the front surface side is of an inwardly concave shape and the battery element is housed in an inner side of the thicker metal layer of the inwardly concave shape.

3. A thin secondary battery of claim 1 or 2, wherein the metal layer at the front surface side is made of a metal selected from the group consisting of an aluminum alloy and a magnesium alloy.

4. A thin secondary battery of any one of claims 1 to 3, wherein the metal layer at the front surface side is obtained by molding a rolled sheet by press.

5. A thin secondary battery of any one of claims 1 to 4, wherein the metal layer at the back surface side is made of a metal selected from the group consisting of aluminum, stainless, nickel and copper.

6. A thin secondary battery of any one of claims 1 to 5, wherein the metal layer at the front surface side is a layer by casting.

7. A thin secondary battery of any one of claims 1 to 6, wherein a protective layer is only provided on a surface of the metal layer at the front surface side.

* * * * *